(12) United States Patent
May

(10) Patent No.: US 8,831,005 B2
(45) Date of Patent: Sep. 9, 2014

(54) PROCESSING DATA UNITS

(71) Applicant: Nvidia Corporation, Santa Clara, CA (US)

(72) Inventor: Alexander May, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 94 days.

(21) Appl. No.: 13/715,205

(22) Filed: Dec. 14, 2012

(65) Prior Publication Data

US 2013/0315201 A1 Nov. 28, 2013

(30) Foreign Application Priority Data

May 23, 2012 (GB) .................................. 1209200.3

(51) Int. Cl.
*H04L 12/28* (2006.01)
*H04W 36/02* (2009.01)

(52) U.S. Cl.
CPC .................................. *H04W 36/023* (2013.01)
USPC ............................ 370/394; 370/331; 455/436

(58) Field of Classification Search
None
See application file for complete search history.

(56) References Cited

U.S. PATENT DOCUMENTS

| | | | | |
|---|---|---|---|---|
| 2002/0172208 A1* | 11/2002 | Malkamaki | .................. | 370/400 |
| 2006/0062223 A1* | 3/2006 | Manuel et al. | ................. | 370/394 |
| 2007/0106924 A1* | 5/2007 | Seidel et al. | .................. | 714/748 |
| 2009/0086677 A1* | 4/2009 | Ho | ............... | 370/331 |
| 2009/0168723 A1 | 7/2009 | Meylan | | |
| 2009/0221242 A1* | 9/2009 | Bergstrom et al. | ............. | 455/73 |
| 2010/0195519 A1* | 8/2010 | Ji | .................. | 370/252 |
| 2011/0268088 A1* | 11/2011 | Lindskog et al. | ............. | 370/331 |
| 2012/0039301 A1* | 2/2012 | Kim et al. | ...................... | 370/331 |
| 2012/0219018 A1* | 8/2012 | Shi | ................. | 370/498 |
| 2013/0194933 A1* | 8/2013 | Celik et al. | .................... | 370/242 |
| 2013/0250915 A1 | 9/2013 | Ohta et al. | | |
| 2013/0315202 A1* | 11/2013 | May | ............................ | 370/331 |

FOREIGN PATENT DOCUMENTS

| | | |
|---|---|---|
| EP | 1276293 A2 | 1/2003 |
| EP | 2015526 A2 | 1/2009 |
| EP | 2141937 A1 | 6/2010 |
| WO | 2009018318 A2 | 2/2009 |
| WO | 2009058903 A1 | 5/2009 |
| WO | 2009070576 A2 | 6/2009 |
| WO | 2010044521 A1 | 4/2010 |
| WO | 2012147656 A1 | 11/2012 |

OTHER PUBLICATIONS

European Search Report dated Nov. 11, 2013, Application No. GB1209200.3, 5 pages.
"LTE; Evolved Universal Terrestrial Radio Access (E-UTRA); Packet Data Convergence Protocol (PDCP) Specification (3GPP TS 36.323 Version 10.1.0 Release 10)," 3GPP, ETSI, TS 136.323, vol. 10.1.0, Mar. 2011, 28 pages.

* cited by examiner

*Primary Examiner* — Anh-Vu Ly

(57) ABSTRACT

An embodiment of a method for processing data units is provided that includes receiving a plurality of data units, of a data stream, having respective sequence numbers and, employing a reordering window, determining whether a newly received data unit of the data stream is a new data unit or a repeated data unit at the receiver and defining a first and a second range of sequence numbers relative to the sequence number of a previously received data unit. A newly received data unit is determined to be either a new or a repeated data unit based on whether the sequence number of the newly received data unit falls within the first or second range, and processed at the receiver based on this determination. A handover condition is detected, and in response thereto the first and second ranges of the reordering window are adjusted for use during the handover condition.

20 Claims, 5 Drawing Sheets

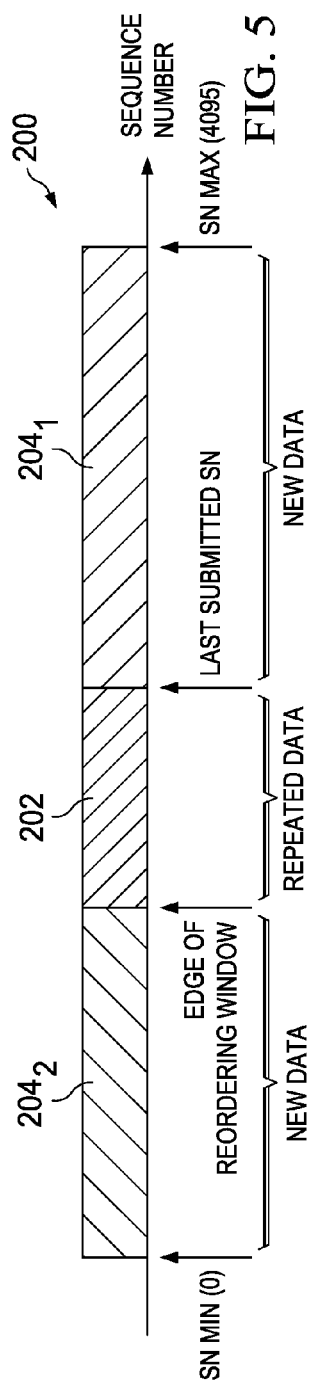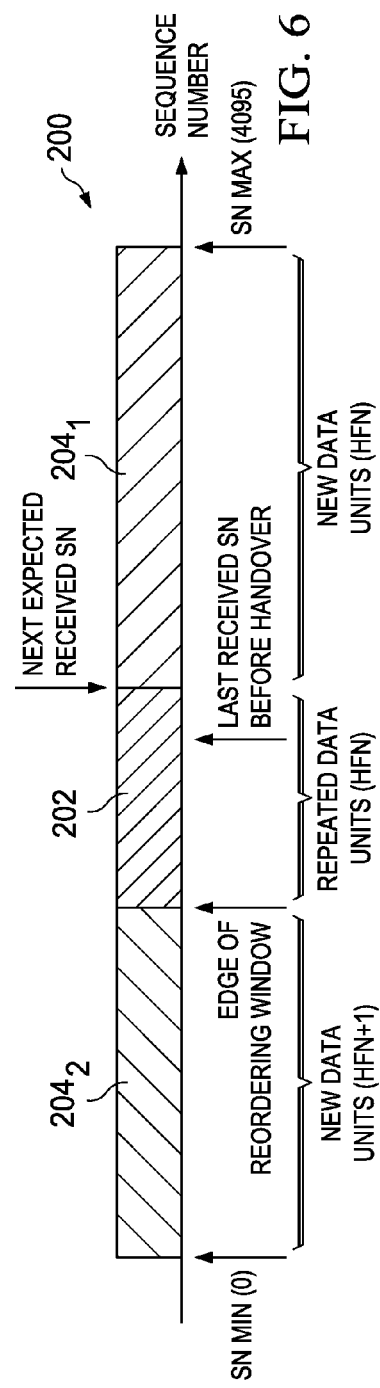

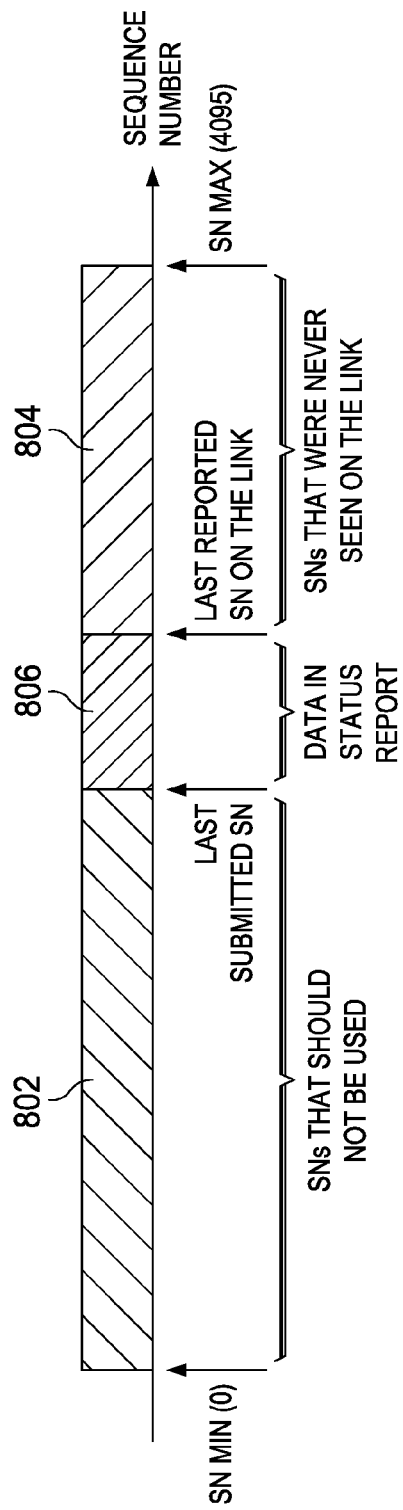

PROCESSING DATA UNITS

CROSS REFERENCES TO RELATED APPLICATION

This application claims priority from GB Application No. 1209200.3 filed on May 23, 2012, entitled "Processing Data Units," by Alexander May. The above application is commonly assigned with this application and is incorporated herein by reference in its entirety.

TECHNICAL FIELD

The disclosure relates to processing data units. In particular, the disclosure relates to processing data units at a receiver or at a transmitter.

BACKGROUND

A radio access network allows entities to communicate with each other over a wireless, radio channel. For example, a user equipment (UE) is able to communicate with network elements such as a base station over the radio access network. When entities communicate with each other they must conform to standard protocols so that each entity can correctly interpret the data received from other entities.

Third Generation Partnership Project (3GPP) Long Term Evolution, referred to as LTE, is a standard for wireless communication of high-speed data over a radio access network which allows a user equipment (UE) such as a mobile phone to communicate over the network. 3GPP technical specification TS 36.323 defines the functionality of the Packet Data Convergence Protocol (PDCP) for use in LTE. In particular the 3GPP TS36.323 specification defines (i) a sequence number, (ii) a discard timer, and (iii) a reordering window for Packet Data Convergence Protocol (PDCP) in LTE. PDCP is one of the layers of the Radio Traffic Stack in the Universal Mobile Telecommunications System (UMTS) and performs Internet Protocol (IP) header compression and decompression, transfer of user data, maintenance of sequence numbers for Radio Bearers and ciphering/deciphering of data.

According to PDCP, a new sequence number (SN) is assigned to each PDCP Protocol Data Unit (PDU), or in other words to each IP packet, when that PDU (or "packet") is transmitted. The SN is used to align a sending PDCP entity (or "transmitter") and a receiving PDCP entity (or "receiver"). For example, the PDUs form a data stream and the sequence numbers can be used (with hyper frame numbers as described below) to indicate the position of each PDU in the data stream. In this way, the sequence numbers assigned to the PDUs allow both the transmitter and the receiver to correctly align each PDU within the data stream. This is important so that the receiver can receive and correctly decipher the PDUs of the data stream that are transmitted from the transmitter. According to the current 3GPP standard, in acknowledged mode (AM), the SN is a 12 bit value which takes values from 0 to 4095, such that there are 4096 distinct sequence numbers. The SN is increased for each PDCP PDU and regularly loops over from 4095 to 0 every 4096 PDCP PDUs. At every SN loop over (that is, every time the sequence number changes from 4095 to 0), a local hyper frame number (HFN) is incremented. Both the transmitter and the receiver keep track of a local HFN to ensure that the transmitter and receiver are aligned with each other in terms of the positions of PDUs within a data stream. The HFN and the SN define a PDU's position within the data stream. The SN is assigned to the PDUs and transmitted with the PDUs from the transmitter to the receiver. In contrast, the HFN is not transmitted with the PDUs and instead, both the transmitter and the receiver keep track of the HFN locally. The HFN and SN are some of the input parameters for the ciphering/deciphering process which is used to encrypt/decrypt the data on the radio path.

If the transmitting entity and the receiving entity become misaligned with respect to their HFNs then the receiving entity will encounter problems when trying to decipher the PDUs of the data stream received from the transmitting entity.

SUMMARY

According to a first aspect, the disclosure provides a method of processing data units at a receiver. In one embodiment, the method includes: receiving a plurality of data units, of a data stream, having respective sequence numbers; determining, using a reordering window, whether a newly received data unit of the data stream is a new data unit or a repeated data unit at the receiver, wherein the reordering window defines: (i) a first range of sequence numbers relative to the sequence number of a previously received data unit, and (ii) a second range of sequence numbers relative to the sequence number of the previously received data unit, wherein if the sequence number of the newly received data unit falls within the first range then the newly received data unit is determined to be a repeated data unit, and wherein if the sequence number of the newly received data unit falls within the second range then the newly received data unit is determined to be a new data unit; processing the newly received data unit at the receiver based on the determination as to whether the newly received data unit is a new data unit or a repeated data unit; detecting a handover condition; and in response to detecting the handover condition, adjusting the first and second ranges of the reordering window for use during the handover condition.

According to a second aspect, the disclosure provides a receiver configured to process data. In one embodiment, the receiver includes: an antenna configured to receive a plurality of data units, of a data stream, having respective sequence numbers; and a processor configured to: determine, using a reordering window, whether a newly received data unit of the data stream is a new data unit or a repeated data unit at the receiver, wherein the reordering window defines: (i) a first range of sequence numbers relative to the sequence number of a previously received data unit, and (ii) a second range of sequence numbers relative to the sequence number of the previously received data unit, wherein if the sequence number of the newly received data unit falls within the first range then the newly received data unit is determined to be a repeated data unit, and wherein if the sequence number of the newly received data unit falls within the second range then the newly received data unit is determined to be a new data unit; process the newly received data unit at the receiver based on the determination as to whether the newly received data unit is a new data unit or a repeated data unit; detect a handover condition; and in response to detecting the handover condition, adjust the first and second ranges of the reordering window for use during the handover condition.

According to a third aspect, the disclosure provides a computer program product for processing data units at a receiver. In one embodiment, the computer program product is embodied on a non-transient computer-readable medium and configured so as when executed on a processor of the receiver to perform operations according to the methods described herein.

BRIEF DESCRIPTION OF THE DRAWINGS

For a better understanding of the disclosure and to show how the same may be put into effect, reference will now be made, by way of example, to the following drawings in which:

FIG. 5 is a third representation of a reordering window;

FIG. 6 is a fourth representation of a reordering window;

FIG. 8 is a representation of sequence numbers which can be assigned to data units.

DETAILED DESCRIPTION

Figure 1:
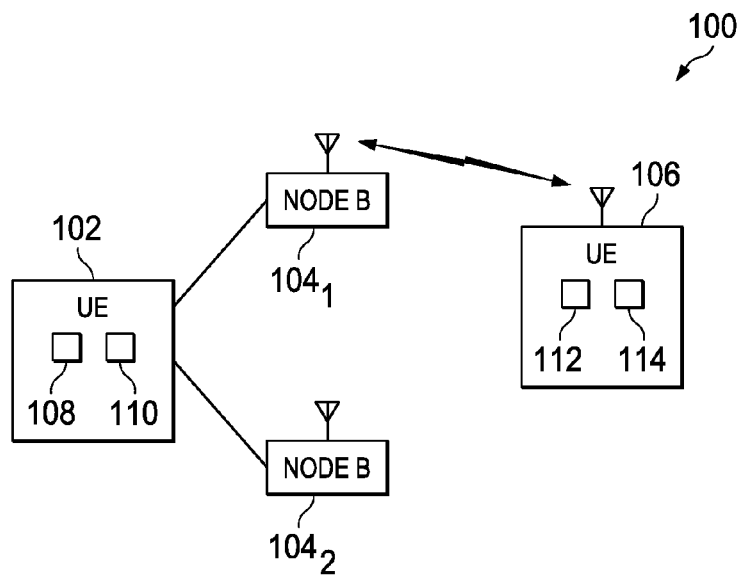
FIG. 1 shows a radio access network.

The disclosure realizes that one situation (e.g. in which a discard timer is running) in which a transmitter and a receiver may become misaligned with respect to their HFNs is during a handover between cells of a radio access network. During a handover, PDUs of a data stream may get deleted thereby causing a gap in the sequence numbers of the PDUs of the data stream that are received at the receiver. This may cause the receiver to incorrectly determine whether a received PDU is a new PDU of the data stream or a repeated PDU of the data stream. This may result in a misalignment with respect to the HFNs of the transmitter and the receiver during the handover.

Therefore, the disclosure provides the above noted method of processing data units at a receiver, the receiver configured to process data and the computer program product. In embodiments described herein, a reordering window at the receiver is adjusted during a handover condition to thereby increase the proportion of sequence numbers which are recognized as indicating new data units of the data stream compared to the proportion of sequence numbers which are recognized as indicating repeated data units of the data stream. In this way, the reordering window at the receiver is adjusted to suit the handover condition. For example, it may be anticipated that large gaps in the sequence numbers may be likely to occur during a handover condition such that in response to detecting a handover the reordering window at the receiver is adjusted to suit a data stream which has large gaps in the sequence numbers of the data units.

Embodiments of the method provide the following advantages. After a handover the sequence number and hyper frame number are still aligned between the transmitter and the receiver even when large blocks of PDUs are deleted during the handover. Valid data gets delivered instead of being discarded. Ciphering parameters are still aligned between the transmitter and the receiver which allows the receiver to receive meaningful data instead of data that gets deciphered wrongly at the receiver. This improves the throughput and reliability of the transmission and reception of the data stream. Therefore the user experience is improved.

The step of adjusting the first and second ranges of the reordering window for use during the handover condition may comprise increasing the size of the second range relative to the size of the first range.

The method may further comprise: in response to detecting the handover condition, determining the lowest sequence number of the second range based on a confirmed sequence number which is confirmed by an old cell of the handover and which is assigned to a data unit which will not be transmitted by a new cell of the handover. Furthermore, the method may further comprise: in response to detecting the handover condition, determining the lowest sequence number of the first range based on the sequence number of the most recently received new data unit of the data stream. Furthermore, the method may further comprise: in response to detecting the handover condition, determining the lowest sequence number of the first range based on a discard timer used in a transmit queue of a transmitter which transmits the plurality of data units to the receiver.

The previously received data unit may be the most recently received new data unit of the data stream.

The sequence numbers may be incremented for each data unit of the data stream and may be repeated after a predetermined maximum number of distinct sequence numbers, whereby a frame number may be incremented each time the sequence number repeats. The sequence number may be represented by 12 bits and the predetermined maximum number may be 4096.

The first and second ranges may be contiguous and together span the entire range of sequence numbers assigned to data units of the data stream.

The step of processing the newly received data unit at the receiver may comprise at least one of: discarding the newly received data unit; storing the newly received data unit; forwarding the newly received data unit to higher layers at the receiver; and deciphering the newly received data unit using the sequence number of the newly received data unit and a frame number.

Prior to detecting the handover condition the size of the first range may be equal to the size of the second range.

The sequence numbers of the first range may be smaller than or equal to the sequence number of the previously received data unit, and the sequence numbers of the second range may be larger than the sequence number of the previously received data unit. Alternatively, the sequence numbers of a portion of the second range may be smaller than the sequence numbers of the first range, and if the newly received data unit has a sequence number which falls within said portion of the second range then a frame number of the newly received data unit may be determined to be higher than if the newly received data unit has a sequence number which falls within the first range.

Different embodiments will now be described by way of example only.

With reference to FIG. 1 there is a described a radio access network 100 according to an embodiment. The radio access network 100 includes network elements such as a radio network controller (RNC) 102 and two base stations 104$_1$ and 104$_2$ (which may be referred to as Node Bs). The radio access network 100 also includes a UE 106 which is operated by a user. As shown in FIG. 1, the UE 106 comprises a processor 112 for processing data and a memory 114 for storing data, where for example the data is for transmission to, or has been received from, the base stations 104. Generally, there would be more than one UE connected to the network wherein each UE may allow a different user to access the network 100, but only one UE is shown in FIG. 1 for clarity. There would generally be more than two base stations 104 in a radio access network, but only two are shown in FIG. 1 for clarity. Each base station 104 serves a cell, which may be a geographic area, wherein if the UE 106 is within the cell of the base station 104$_1$ then the UE 106 would communicate with the network 100 via the base station 104$_1$. Similarly, if the UE 106 is within the cell of the base station 104$_2$ then the UE 106 would communicate with the network 100 via the base station 104₂. The cells of the base stations 104₁ and 104₂ may be static or dynamic. A handover occurs when the UE 106 changes the base station via which it communicates with the network 100. For example, a handover from cell 1 (of base station 104₁) to cell 2 (of base station 104₂) may occur when the UE 106 moves from cell 1 to cell 2. The UE 106 may be, for example, a mobile phone, a tablet, a gaming device or other device able to connect to the network 100. The UE 106 is arranged to receive information from and output information to the user of the UE 106. In an embodiment the UE 106 comprises output devices such as a display and a speaker and input devices such as a keypad, a touch-screen, and/or a microphone.

The RNC 102 includes a processor 108 for processing data and a memory 110 for storing data, where for example the data is for transmission to, or has been received from, the UE 106. There are other network elements in the network 100 which are not shown in FIG. 1 and which may provide data to the RNC 102 which is to be communicated to the UE 106 and to which data may be provided by the RNC 102.

As described above, the 3GPP technical specification TS 36.323 defines the functionality of the Packet Data Convergence Protocol (PDCP) for use in LTE. In particular the 3GPP TS36.323 specification defines (i) a sequence number, (ii) a discard timer, and (iii) a reordering window for Packet Data Convergence Protocol (PDCP) in LTE, as described in more detail below.

As described above, according to PDCP, a new sequence number (SN) is assigned to each PDCP Protocol Data Unit (PDU), or in other words to each IP packet, when that PDU (or "packet") is transmitted. In the uplink, the UE 106 is the transmitter and one of the base stations 104 is the receiver. In the downlink, one of the base stations 104 is the transmitter and the UE 106 is the receiver. The SN is used to align a sending PDCP entity (or "transmitter") and a receiving PDCP entity (or "receiver"). For example, the PDUs form a data stream and the sequence numbers can be used (with hyper frame numbers) to indicate the position of each PDU in the data stream. In this way, the sequence numbers assigned to the PDUs allow both the transmitter and the receiver to correctly align each PDU within the data stream. This is important so that the receiver can receive and correctly decipher the PDUs of the data stream that are transmitted from the transmitter. According to the current 3GPP standard, in acknowledged mode (AM), the SN is a 12 bit value which takes values from 0 to 4095, such that there are 4096 distinct sequence numbers. The SN is increased for each PDCP PDU and regularly loops over from 4095 to 0 every 4096 PDCP PDUs. At every SN loop over (that is, every time the sequence number changes from 4095 to 0), a local hyper frame number (HFN) is incremented. Both the transmitter and the receiver keep track of a local HFN to ensure that the transmitter and receiver are aligned with each other in terms of the positions of PDUs within a data stream. The HFN and the SN define a PDU's position within the data stream. The SN is assigned to the PDUs and transmitted with the PDUs from the transmitter to the receiver. In contrast, the HFN is not transmitted with the PDUs and instead, both the transmitter and the receiver keep track of the HFN locally. The HFN and SN are some of the input parameters for the ciphering/deciphering process which is used to encrypt/decrypt the data on the radio path.

The terms "PDU" and "packet" are used interchangeably herein.

The discard timer is used to assign a lifetime for each packet in a transmit queue of a sending PDCP entity. In the uplink the sending PDCP entity is the UE 106. In the downlink the sending PDCP entity is one of the base stations 104. If more packets are entered into the transmit queue than can be transmitted, the excess packets may get deleted if they are not transmitted before their respective discard timers expire. When packets get discarded due to the discard timer in the transmit queue, gaps are created in the PDCP PDU data stream and the assigned SNs of the transmitted PDUs of the data stream are not consecutive anymore. For example, five consecutive PDUs of the data stream may be input to the transmit queue with consecutive sequence numbers 1, 2, 3, 4 and 5. In the example, the discard timer for the third of the PDUs expires before the third PDU is output from the transmit queue such that the third PDU is discarded, whereas the first, second, fourth and fifth PDUs are all output from the transmit queue before their respective discard timers expire. In this case, four PDUs will be transmitted from the sending PDCP entity and they will have sequence numbers 1, 2, 4 and 5. Therefore, there will be a gap in the sequence numbers (at number 3) and the sequence numbers of the transmitted PDUs will not all be consecutive due to the gap.

The reordering window is part of an algorithm to handle received packets at the receiving PDCP entity in AM even if the SNs of the received packets are not consecutive. In the downlink the receiving PDCP entity is the UE 106. In the uplink the receiving PDCP entity is one of the base stations 104. The reordering window is used to determine if a received packet is a new packet in the data stream or a repeated packet. When a PDU of the data stream is received at the receiving PDCP entity, the reordering window may determine that the received PDU is a new PDU of the data stream if the received PDU has a sequence number which is greater than (but by no more than 2048) the sequence number of the most recently received new PDU of the data stream. In contrast, when a PDU of the data stream is received at the receiving PDCP entity, the reordering window may determine that the received PDU is a repeated PDU of the data stream if the received PDU has a sequence number which is less than (but by no more than 2047) the sequence number of the most recently received new PDU of the data stream. This is described below in more detail with reference to FIG. 2. The received PDU is processed at the receiver based on the determination as to whether the received PDU is a new data unit or a repeated data unit of the data stream. For example, if it is determined that the received PDU is a repeated PDU of the data stream then the received PDU may be discarded at the receiver. However, if it is determined that the received PDU is a new PDU of the data stream then the received PDU may be stored in PDCP or forwarded to higher layers at the receiver, and may for example be used to decipher the newly received data unit using the sequence number of the newly received data unit and the local hyper frame number (HFN).

Figure 2:
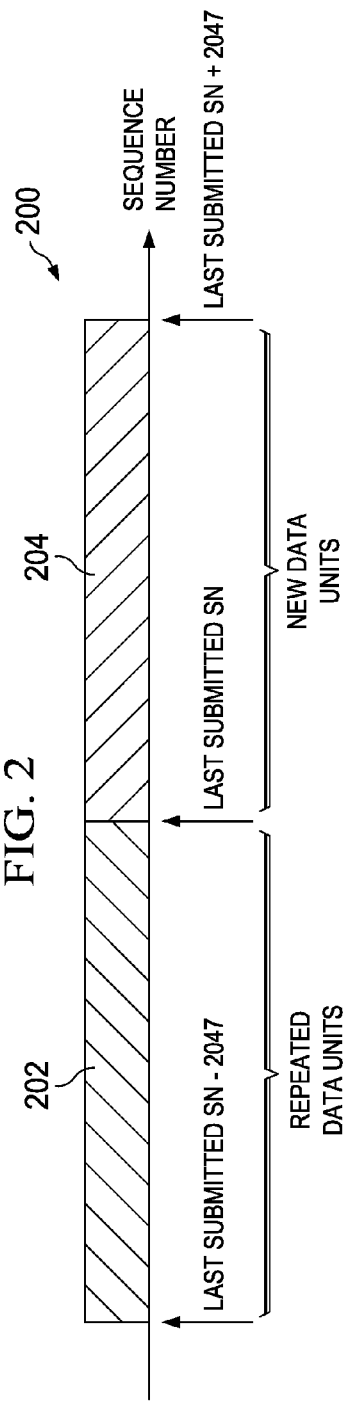
FIG. 2 is a first representation of a reordering window.

FIG. 2 is a representation of the reordering window at the receiving PDCP entity. As described above, the sequence number of a received PDU can take one of 4096 values because the sequence number is represented by 12 bits. FIG. 2 has a horizontal axis indicating increasing sequence numbers. The sequence number of the most recently received new PDU in the data stream is indicated in FIG. 2 as "Last submitted SN". The PDUs which are determined using the reordering window to be new PDUs of the data stream and are submitted to higher layers. Therefore the last submitted PDU is the most recently received new PDU in the data stream. The reordering window defines two ranges of sequence numbers: (i) a first range 202 of sequence numbers relative to the sequence number of last submitted PDU, and (ii) a second range 204 of sequence numbers relative to the sequence number of the last submitted PDU. If the sequence number of a newly received data unit falls within the first range 202 then the newly received data unit is determined to be a repeated data unit. If the sequence number of the newly received data unit falls within the second range 204 then the newly received data unit is determined to be a new data unit. The first and second ranges of sequence numbers 202 and 204 are non-overlapping. The first and second ranges of sequence numbers 202 and 204 are contiguous. The first and second ranges of sequence numbers 202 and 204 together span the entire range (0 to 4095) of sequence numbers assigned to data units of the data stream.

In the simple example shown in FIG. 2, in accordance with the current ETSI standard, the first range 202 is the same size as the second range 204. In this way, the reordering window has a 50/50 division for new and old (or "repeated") packets. The last submitted SN is in the middle of the reordering window. The first range of sequence numbers 202 is less than or equal to the last submitted SN, whereas the second range of sequence numbers 204 is greater than the last submitted SN.

The UE 106 may undergo a handover between cells in the radio access network 100. In examples described herein, the UE 106 undergoes a handover from the first cell associated with the base station $104_1$ to the second cell associated with the base station $104_2$. A running discard timer which is used in the PDCP sending entity sets a lifetime value which controls the maximum time for which a PDU of a data stream will stay in a transmit queue before being discarded. Before a handover occurs, in the downlink, the RNC 102 will place PDUs of the data stream in the transmit queue of the base station $104_1$ (for transmission to the UE 106 via the "old" cell). When, and after the handover has occurred, the RNC 102 will place PDUs of the data stream in the transmit queue of the base station $104_2$ (for transmission to the UE 106 via the "new" cell). Some PDUs may be placed in the transmit queue of the base station $104_1$ prior to the handover, and may still be in the transmit queue of the base station $104_1$ when the handover occurs (i.e. they have not yet been transmitted or discarded when the handover occurs).

Generally, the larger the lifetime value set by the discard timer, the greater the number of PDUs that will be present in the transmit queue of the base station $104_1$ when the handover occurs. The PDUs that are present in the transmit queue of the base station $104_1$ when the handover occurs may be deleted. The deletion of these PDUs causes a gap in the sequence numbers between the last PDCP PDU received at the UE 106 on the old cell (i.e. from the base station $104_1$) and the first PDCP PDU received at the UE 106 on the new cell (i.e. from the base station $104_2$). This gap may become bigger than the reordering window can detect. For example, the reordering window shown in FIG. 2 may be used wherein the last submitted SN (shown to be 2047 in FIG. 2) is the sequence number of the last PDU received on the old cell from the base station $104_1$ prior to the handover. Due to the gap in sequence numbers which may occur at a handover, the first PDU received on the new cell from the base station $104_2$ may be more than 2048 PDUs later than the last PDU received on the old cell from the base station $104_1$ prior to the handover. In other words, the sequence number may be looped back to be less than the last submitted SN (with the HFN being incremented) and therefore may not fall within the second range 204, and may instead fall within the first range 202. In this case the received PDUs are wrongly assumed to be repeated PDUs by the reordering window shown in FIG. 2. As a result the received PDUs may get discarded. Furthermore, the local HFN at the UE 106 might not get increased although the local HFN at the base station $104_2$ is incremented when the sequence number loops back from 4095 to 0. This causes a misalignment of the HFN between the transmitter and the receiver. This can be severely detrimental as the parameters for ciphering the data of the data stream are no longer synchronized between the sender and the receiver.

A scenario in which a gap in the sequence numbers exceeds the gap which can be correctly received by the reordering window shown in FIG. 2 is likely when there are already inconsecutive sequence numbers in the PDUs being transmitted from the base station $104_1$ in the old cell, since this indicates that the PDUs being transmitted are already at the end of their life cycle, i.e. they are being transmitted from the transmit queue at the base station $104_1$ after staying in the transmit queue for almost the lifetime value set by the discard timer. Generally, at higher data rates there will be a larger number of PDUs in the transmit queue waiting to be transmitted as compared to lower data rates. Therefore, at high data rates it can be assumed that there are still a lot of packets pending in the old cell when the handover occurs. Some or all of these pending packets of the old cell might not get forwarded to the new cell and might get deleted. In one example, the sequence number of the first received PDU in the new cell following the handover is one larger than the sequence number of the last discarded PDU in the old cell if no data gets forwarded. Therefore if lots of PDUs are discarded in the old cell then the gap in sequence numbers between PDUs received at the receiving entity (i.e. the UE 106) will be large. The receiving entity may not be aware of this big gap in sequence numbers. In particular, there could be more packets deleted than the reordering window can recognize (more than 2047 in the case of the reordering window shown in FIG. 2).

There are described below multiple solutions to the problem described above of the large gap in sequence numbers during handover. The solutions described below replace the normal behaviour in the case that a discard timer is active and on the assumption that a lot of packets (e.g. more than 2047) are discarded during a handover from the first cell (served by base station $104_1$) to the second cell (served by base station $104_2$).

With reference to FIGS. 3 to 6 there are described embodiments implemented at the receiving entity (wherein the examples described below relate to the downlink such that the receiving entity is the UE 106, although corresponding methods could be used in the uplink).

Figure 3:
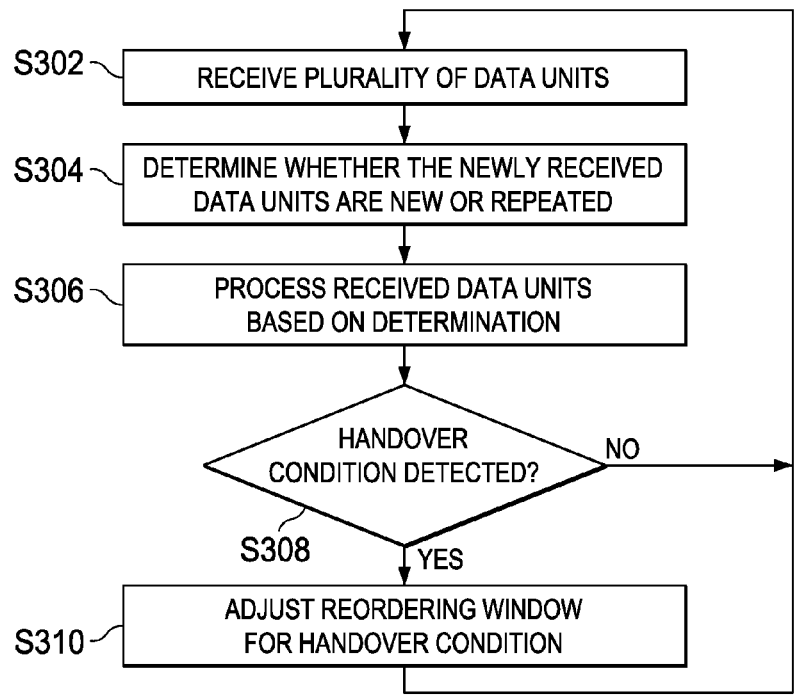
FIG. 3 is a flow chart for a method of processing data units at a receiver.

FIG. 3 shows a flow chart for a process of processing PDUs at the receiving entity (the UE 106). In step S302 the UE 106 receives a plurality of PDUs of the data stream from the base station $104_1$. As described above, each of the PDUs has assigned to it a sequence number. The PDUs are transmitted from the base station $104_1$ according to a radio transmission standard. The PDUs are received at the UE 106 using an antenna of the UE 106 and are processed by the processor 112 of the UE 106.

In step S304 it is determined at the UE 106 (e.g. by processing performed by the processor 112) whether each of the newly received PDUs are new or repeated PDUs of the data stream. A reordering window such as that shown in FIG. 2 may be used for this determination. In particular, the sequence number of a newly received PDU is compared with the sequence number of the last submitted PDU, that is, the most recently received PDU which is determined to be a new PDU and which is submitted for processing by higher layers at the UE 106. As described above, if the sequence number of a newly received PDU falls within the first range 202 then it is determined that the newly received PDU is a repeated PDU in the data stream. In contrast, if the sequence number of the newly received PDU falls within the second range 204 then it is determined that the newly received PDU is a new PDU in the data stream.

In step S306 the newly received PDUs are processed at the UE 106 (e.g. using processor 112) based on the determination performed in step S304. For example, if a newly received PDU is determined in step S304 to be a repeated PDU of the data stream then the newly received PDU may be discarded in step S306. However, if for example, a newly received PDU is determined in step S304 to be a new PDU of the data stream then in step S306 the newly received PDU may be stored at the UE 106 (e.g. in the memory 114), forwarded to higher layers for processing at the UE 106, and/or deciphered using the sequence number of the newly received PDU and the local HFN at the UE 106. Additionally, or alternatively, a newly received PDU may be processed in other ways at the UE 106 in step S306 based on the determination performed in step S304. The PDUs may contain user data and/or PDCP control data. In one embodiment, the processing performed in step S306 might only be performed for user data and not for PDCP control data.

In step S308 it is determined at the UE 106 (e.g. using the processor 112) whether a handover condition has been detected. In the case that a handover condition has not been detected, the PDUs of the data stream continue to be transmitted from the base station $104_1$ in the first cell and the method repeats back to step S302 in order to continue to receive and process the PDUs of the data stream as described above.

However, if a handover condition is detected in step S308 then the method passes to step S310. In examples described herein a handover is detected from the first cell (served by base station $104_1$) to the second cell (served by base station $104_2$).

In step S310 the first and second ranges of the reordering window are adjusted for use during the handover condition. In particular, the first and second ranges of the reordering window are adjusted to increase the proportion of received data units which are determined, using the reordering window, to be new data units.

Figure 4:
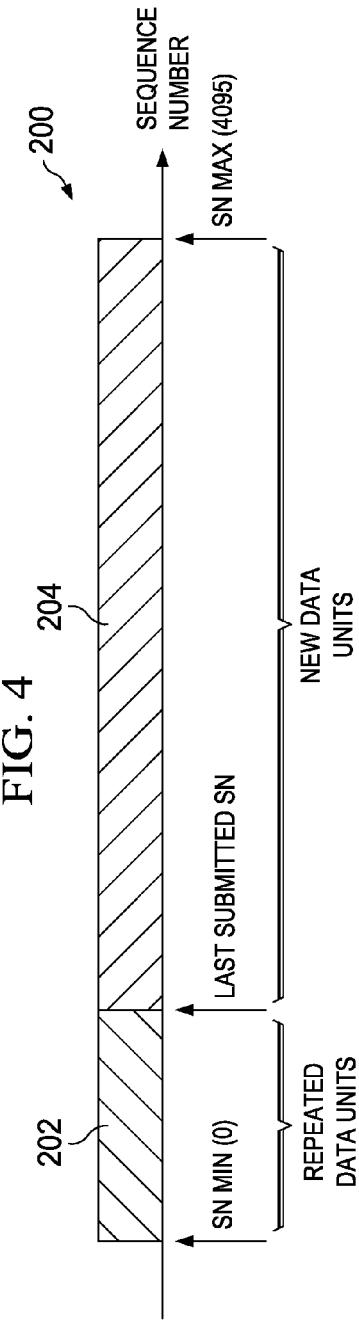
FIG. 4 is a second representation of a reordering window.

For example, as shown in FIG. 4, the reordering window 200 has been shifted to thereby detect more sequence numbers as indicating new PDUs, compared to the number of sequence numbers indicating repeated PDUs. In particular, the reordering window has been adjusted such that the first range 202 is smaller than the second range 204. So, instead of having half of all possible sequence numbers being detected as old ones (i.e. indicating repeated PDUs), the proportion could be decreased to a smaller value, e.g. only ⅛ of all possible sequence numbers being detected as old ones (i.e. indicating repeated PDUs).

Following step S310 the method proceeds back to step S302. The method then continues whereby PDUs are received at the UE 106 from the base station $104_2$ in the new cell and are processed using the adjusted reordering window at the UE 106. In this way, the size of the second range 204 can be increased during a handover condition to thereby adjust the reordering window to better handle large gaps in sequence numbers which may occur in the data stream during a handover. In particular, increasing the size of the second range 204 relative to the size of the first range 202 increases the likelihood that received PDUs are determined, using the reordering window, to be new data units of the data stream. When the handover condition has finished, the reordering window may be adjusted back (not shown in FIG. 3) to that shown in FIG. 2 so that the UE 106 can proceed to process received PDUs in a "normal" mode, i.e. not in a mode that is adjusted for use during a handover condition.

FIG. 4 shows the reordering window 200 being adjusted in the case of no overflow of sequence numbers. However, FIG. 5 shows another example of the reordering window 200 which includes an overflow of sequence numbers and an associated HFN increase. Similar to the adjustment of the reordering window shown in FIG. 4, the reordering window shown in FIG. 5 has been adjusted such that the first range 202 is smaller than the second range 204. However, the last submitted SN is shown to be approximately in the middle of the reordering window (i.e. at a value of approximately 2047). The first range 202 does not cover all of the sequence numbers lower than the last submitted SN. Instead, the second range 204 is divided into two portions: a first portion $204_1$ which covers the sequence numbers above the last submitted SN, and a second portion $204_2$ which covers the sequence numbers from 0 up to the lowest sequence number of the first range 202. In this embodiment, the UE 106 assumes that if a PDU has a sequence number that falls in the second portion of the second range $204_2$ then the sequence number must have been looped back to 0 at the PDCP sending entity and as such the local HFN at the UE 106 is increased by one. Therefore, if the local HFN at the UE 106 has a value HFN for the last submitted SN, then the UE 106 determines that the HFN for a newly received PDU of the data stream is HFN if the newly received PDU has a sequence number which falls within the first range 202 or within the first portion of the second range $204_1$. However, the UE 106 determines that the HFN for a newly received PDU of the data stream is HFN+1 if the newly received PDU has a sequence number which falls within the second portion of the second range $204_2$. In this way, the join between the second portion of the second range $204_2$ and the first range 202 is the edge of the reordering window. In other words, the lower edge of the reordering window for arriving PDUs is the lowest sequence number of the first range 202. PDUs which have a sequence number and HFN combination in the data stream which is earlier in the data stream than the lower edge of the reordering window may not be correctly determined as repeated PDUs by the reordering window. Similarly, the upper edge of the reordering window for arriving PDUs is the highest sequence number of the second portion of the second range $204_2$. PDUs which have a sequence number and HFN combination in the data stream which is later in the data stream than the upper edge of the reordering window may not be correctly determined as new PDUs by the reordering window. However, PDUs which have a sequence number and HFN combination in the data stream which is between the lower and upper edges of the reordering window are correctly determined as either repeated or new PDUs by the reordering window.

In general the value of the last submitted SN may take any value within the allowed range of sequence numbers (i.e. between 0 and 4095), and as such it is likely that the reordering window will include an overflow such as that shown in FIG. 5. Conceptually, the reordering window shown in FIG. 4 is similar to that shown in FIG. 5 except that the edge of the reordering window is found at the join between sequence numbers 4095 and 0.

FIG. 6 shows another example of how the reordering window 200 can be adjusted in the handover condition. Similar to the adjustment of the reordering window shown in FIGS. 4 and 5, the first range 202 is smaller than the second range 204 (which comprises a first portion $204_1$ and a second portion $204_2$). However, in this embodiment, step S310 comprises using a dynamical calculation based on the SN for which the PDCP receiving entity (e.g. UE 106) is sure that definitely got confirmed by the old cell (served by base station $104_1$) prior to the handover and will not be retransmitted in the new cell (served by base station $104_2$). The UE 106 can determine this last confirmed sequence number due to the Radio Link Control (RLC) Acknowledged Mode (AM) procedures running between the UE 106 and the base station $104_1$. RLC is situated below PDCP. RLC transmits all the PDCP PDUs in sequence order. The RLC entity on the receiving side (e.g. UE 106) confirms the correctly received RLC packets back to the transmitting side (e.g. base station $104_1$). The RLC entity on the receiving side can also ask for retransmission if there is a problem with the transmission link. During normal operation, the transmitting RLC entity confirms successfully transmitted PDCP PDUs to the transmitting PDCP entity in sequence. Therefore, the transmitting PDCP entity knows that this packet was correctly received. Furthermore, during normal operation, the receiving RLC entity forwards successfully received PDCP PDUs to the receiving PDCP entity in sequence. Therefore, the receiving PDCP can assume that the receiving RLC entity confirmed this packet to the transmitting RLC entity.

For example, let us assume that there are five PDCP PDUs to be transmitted in the RLC layer: 1 2 3 4 5. PDUs 1, 2, 4 and 5 are correctly transmitted and received. However, PDU 3 has a high Bit Error Rate (BER) during transmission and is not correctly received. Therefore, the receiving RLC entity asks for retransmission of PDU 3 and confirms to the transmitting RLC entity the successful reception of PDUs 1, 2, 4 and 5. The receiving RLC entity then forwards the successfully transmitted PDUs 1 and 2 towards the receiving PDCP entity. However, PDUs 4 and 5 won't be forwarded towards the PDCP layer until PDU 3 has been successfully retransmitted and received. This means that the PDUs are delivered to the receiving PDCP entity in the order of their sequence numbers. However, during handover or reestablishment the RLC entity of the receiving side can forward all correctly received packets to the PDCP layer even if they are not in sequence. The transmitting PDCP entity is not aware of this until it receives a status report from the receiving PDCP entity (if configured to do so).

Based on the determination of the last confirmed sequence number, the UE 106 can determine the first sequence number which it expects to be transmitted in the new cell (i.e. by the base station $104_2$). For example, the UE 106 may determine that the next expected received SN is one greater than the SN of the last PDU that was confirmed by the old cell (served by the base station $104_1$). This dynamic calculation would be based on the last received packet before the handover command was received. Furthermore, some SNs are added to the first range 202 prior to the SN of the last received packet before the handover for security reasons, since it is possible to receive a repeated PDU after the handover which has a sequence number lower than that of the last received PDU before the handover. Therefore, as shown in FIG. 6, the first range 202 extends above and below the sequence number of the last received packet before handover. This embodiment of the method allows the first range 202 to be adjusted to be very small, such that only a small range of sequence numbers are recognized indicating repeated packets in the data stream. In this way, the reordering window 200 can be adjusted to be suited to the handover condition in which large gaps may occur in the sequence numbers of the received PDUs of the data stream.

Furthermore, the determination of the next expected received SN following a handover may be based on the lifetime value of the discard timer used in the transmit queues of the base stations $104_1$ and $104_2$. The lifetime value of the discard timer is part of the configuration when the radio bearer gets established. The network configures this value and informs the UE 106 of the value. For example, a higher lifetime value used by the discard timer in the base station $104_1$ may result in a greater number of PDUs being discarded due to the handover, such that the sequence number of the next expected PDU following the handover may be increased.

The methods described above with reference to FIGS. 3 to 6 are implemented on the receiving entity and may be implemented without any impact on the sending entity. These methods do not need an upgrade of the current 3GPP TS 36.323 specification. The adjustment of the reordering window shown in FIGS. 4 and 5 may be particularly advantageous since this is the simpler than the adjustment of the reordering window shown in FIG. 6. The adjustment of the reordering window shown in FIG. 6 may be particularly advantageous since this allows a greater proportion of the sequence numbers to be recognized by the reordering window as indicating new PDUs of the data stream. In other words, with the reordering window shown in FIG. 6 the difference between the sizes of the first and second ranges 202 and 204 may be greater than that with the reordering window shown in FIGS. 4 and 5.

Figure 7:
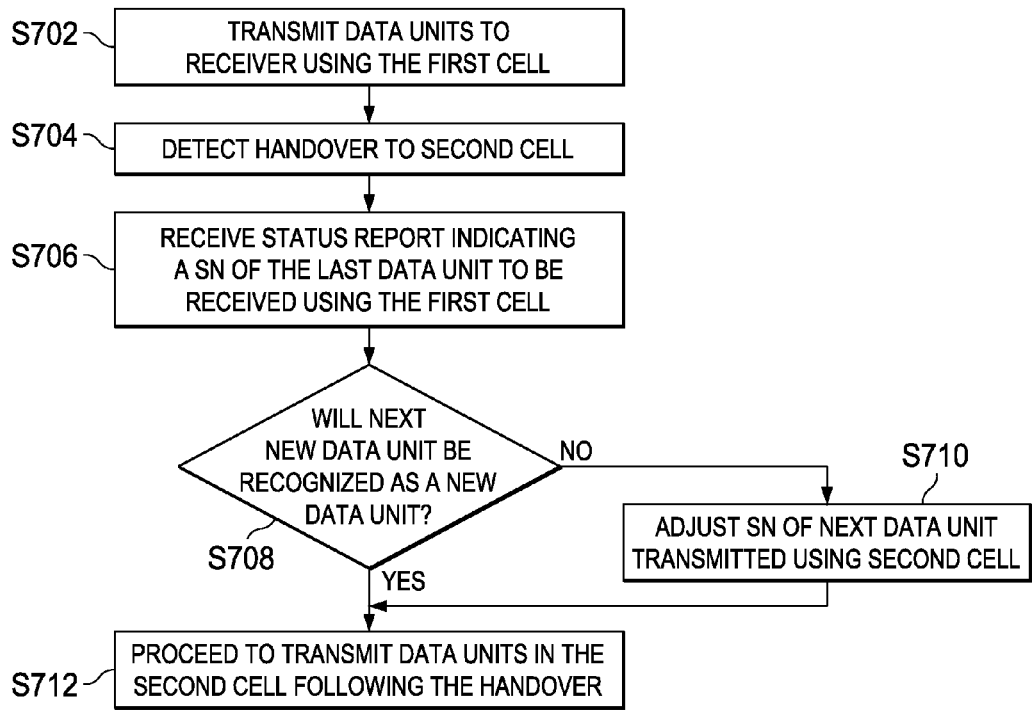
FIG. 7 is a flow chart for a first method of processing data units at a transmitter.
Figure 9:
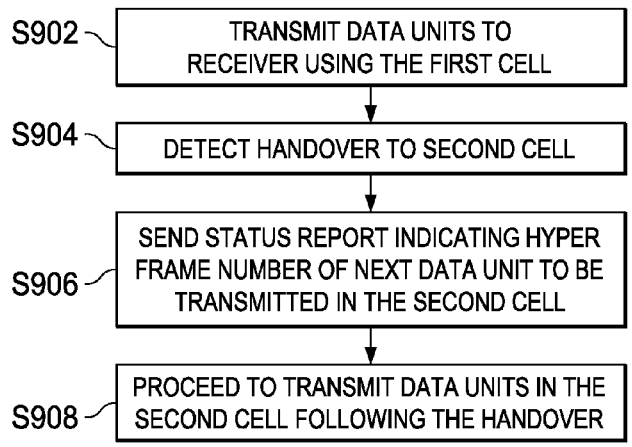
FIG. 9 is a flow chart for a second method of processing data units at a transmitter.

With reference to FIGS. 7 to 9 there are described embodiments implemented at the transmitting entity (wherein the examples described below relate to the downlink such that the transmitting entity is a base station $104_1$ or $104_2$, although similar methods could be used in the uplink).

FIG. 7 shows a flow chart for a process of processing PDUs at the transmitting entity (the base station $104_1$ or $104_2$). In step S702, a plurality of PDUs of a data stream are transmitted in a first cell from the base station $104_1$ to the UE 106. As described above, each of the PDUs has assigned to it a sequence number. The PDUs are transmitted from the base station $104_1$ according to a radio transmission standard. The PDUs are received at the UE 106 using an antenna of the UE 106 and are processed by the processor 112 of the UE 106.

In step S704 a handover condition is detected, wherein the handover is from the first cell (served by the base station $104_1$) to the second cell (served by the base station $104_2$).

In step S706 status reports are exchanged between the UE 106 and the base station $104_2$ on the second cell, i.e. on the new cell. After the handover, status reports are exchanged between transmitting and receiving entities to inform the connected sending PDCP entity (of the new cell) about the last packets that were received on the old cell (even if there were gaps in the data stream). The sending entity then has the possibility to resend only the missing packets before continuing with sending new data. Step S706 may be performed as part of the handover process depending on the network. The network can configure the entities to send status reports as the first message after a handover, but this is not mandatory. After a handover, 3GPP allows directly the sending of all the buffered data packets on the transmission queue without waiting for a status report from the far end. Therefore, the sending PDCP entity does not wait for the status report before proceeding following a handover.

The status report received at the base station $104_2$ from the UE 106 reports gaps in the sequence numbers of the PDUs transmitted in the old cell prior to the handover. On reception of the status report from the UE 106, the sending entity (that is, the base station $104_2$) evaluates if it has some data to fill the reported SN gaps of the old cell. If this is not the case, then in step S708 the transmitting entity (that is, the base station $104_2$) evaluates if the receiving entity (that is, the UE 106) would be able to detect the sequence numbers correctly, e.g. if the difference between the "reported first missing SN" and the "first SN to be used in the new cell" will be lower than the size of the second range 204 of the reordering window. In other words it is determined whether the next new PDU to be transmitted on the new cell (from the base station 104$_2$) will be correctly recognized as a new PDU, rather than incorrectly recognized as a repeated PDU, by the UE 106.

If the base station 104$_2$ determines that the next new PDU transmitted on the new cell following the handover will be recognized correctly by the UE 106 as a new PDU of the data stream then the method passes from step S708 to step S712 and the base station 104$_2$ proceeds to transmit the PDUs of the data stream in the new cell following the handover.

However, if the base station 104$_2$ determines that the next new PDU transmitted on the new cell following the handover will not be recognized correctly by the UE 106 as a new PDU of the data stream then the method passes from step S708 to step S710. In step S710 the sequence number of the next PDU to be transmitted in the new cell following the handover from base station 104$_2$ to UE 106 is adjusted so that the UE 106 will recognize the PDU as a new PDU of the data stream.

In order for the base station 104$_2$ to perform the determination of step S708, the base station 104$_2$ may analyse the status report of the sending PDCP entity and thereby know the first missing SN (that is, the sequence number of the first missing packet) and the last received SN (that is, the sequence number of the last received packet). The base station 104$_2$ can add one to the SN of the last received packet to determine a sequence number for use with the next packet to be transmitted. This SN (i.e. one above the SN of the last received packet) was never seen on the link before. Normally the difference between the first missing SN and the last received SN being reported in the status report should be less than 2046 (i.e. less than half the total size of the reordering window used at the receiver). In theory, waiting for the status report would mean that there is no need to repeat the transmission of any packet, because the sending entity would know what the receiving entity is expecting to receive and which packets are missing from the packets received at the receiving entity.

Using the same example as that given above, let us assume that there are five PDCP PDUs to be transmitted in the RLC layer: 1 2 3 4 5. PDUs 1, 2, 4 and 5 are correctly transmitted and received. However, PDU 3 has a high Bit Error Rate (BER) during transmission and is not correctly received. The first missing PDU is PDU 3. The last received PDU is PDU 5. Then there is a handover to the new cell. If the new cell is not aware of the content of PDU 3 (e.g. if PDU 3 was discarded or not forwarded from the old to the new cell) then the sequence number of the next packet to be transmitted may be determined to be 6 (that is, one larger than 5). The receiving entity will recognize PDU 6 as a new PDU. However, if PDU 3 is available on the new cell, the new cell will first send the PDU 3 and then the PDU 6 afterwards. The status report carries a bit field indicating the missing packets. Based on the "first missing SN", the length of this bit field and the last bit set to '1', a range of SNs were reported in the status report. The last reported SN being received correctly is the last '1' in the bit field. Later used SNs were never seen by the receiving PDCP entity on the link.

As an example, if the UE 106 is using the reordering window shown in FIG. 2 then the UE 106 will recognize sequence numbers between 2048 and 4095 as indicating new PDUs of the data stream whereas sequence numbers between 0 and 2047 are recognized as indicating repeated PDUs of the data stream.

FIG. 8 shows which sequence numbers would, and which would not, be suitable for use with new PDUs transmitted to the UE 106 in a new cell following a handover when the UE 106 is using the reordering window shown in FIG. 2. The range of sequence numbers 802 shows sequence numbers that should not be used because the UE 106 will recognize these sequence numbers as indicating repeated PDUs on the data stream when the UE 106 uses the reordering window shown in FIG. 2. The range 802 extends from the lower edge of the reordering window (shown to be at sequence number 0 in FIG. 2) up to the last submitted sequence number. The status report indicates the first missing SN. The last submitted sequence number is one less than the first missing SN. In the example given above, the first missing SN is 3 and the last submitted sequence number is 2. The range of sequence numbers 804 shows sequence numbers which are suitable for use for a new PDU that is transmitted from the base station 104$_2$ to the UE 106 in the new cell, wherein a sequence number in the range 804 will be recognized by the UE 106 as indicating a new PDU in the data stream. This is because the sequence numbers fall into the range 204 shown in FIG. 2. The range 804 starts with a sequence number that is one larger than the sequence number of the last PDU in the data stream that was reported in the status report as being successfully received in the old cell (served by base station 104$_1$). The range 804 extends up to the upper edge of the reordering window (shown to be at sequence number 4095 in FIG. 2) because this is the maximum sequence number that is recognized by the UE 106 as indicating a new PDU when the UE 106 uses the reordering window shown in FIG. 2. The sequence numbers in the range 806 between the last submitted SN and the last reported SN in the old cell are reported in the status report. Sequence numbers in the range 806 should not be assigned to new PDUs to be transmitted by the base station 104$_2$ following the handover. In this embodiment, the sequence numbers in the range 806 can only be used for data that gets repeated in the new cell, i.e. unconfirmed data that is forwarded from the base station 104$_1$ to the base station 104$_2$. After such forwarding the base station 104$_2$ has analysed the status report and knows now which packets need to be resent. Reusing the sequence numbers from the range 806 (i.e. the "missing SNs") for new data is not possible, since it will disrupt the order of the packets at the receiving PDCP entity.

Therefore, if the check in step S708 indicates a possible misalignment between the sending entity and the receiving entity, then the sending entity adapts the sequence number of the first PDU to be transmitted in the new cell in step S710 to be low enough so that it can be detected as a new packet by the receiving entity. For example, the sequence number of the first PDU to be transmitted in the new cell may be set to be one larger than the sequence number of the last reported PDU that was successfully received at the receiving entity on the old cell.

The method shown in FIG. 7 would shortly delay the processing after a handover. However, the drawback of this may be significantly outweighed by the benefit of avoiding a complete de-synchronization between the sending entity and the receiving entity. This method would need an upgrade of the current 3GPP TS 36.323 specification.

FIG. 9 shows a flow chart for another method of processing PDUs at the transmitting entity (the base station 104$_1$ or 104$_2$). Steps S902 and S904 are the same as steps S702 and S704 described above. Therefore, in step S902, a plurality of PDUs of a data stream are transmitted in a first cell from the base station 104$_1$ to the UE 106. As described above, each of the PDUs has assigned to it a sequence number. The PDUs are transmitted from the base station 104$_1$ according to a radio transmission standard. The PDUs are received at the UE 106 using an antenna of the UE 106 and are processed by the processor 112 of the UE 106.

In step S904 a handover condition is detected, wherein the handover is from the first cell (served by the base station $104_1$) to the second cell (served by the base station $104_2$).

In step S906 extended status reports are exchanged between the UE 106 and the base station $104_2$ on the second cell, i.e. on the new cell. An extended status report that is sent in step S906 from the base station $104_2$ to the UE 106 contains the HFN of the next PDU that is to be sent. In this way, it can be explicitly ensured that the sending entity and the receiving entity are aligned with respect to their local HFNs.

In step S908 the base station $104_2$ proceeds to transmit the PDUs in the new cell following the handover. Since the HFN of the new PDU is explicitly reported to the UE 106, the UE 106 can use the HFN and the SN of the next received PDU to correctly decode the data.

The method shown in FIG. 9 may provide the best solution to ensuring that the sending entity and the receiving entity are aligned with respect to their local HFNs. However, this method might be less desirable in terms of the security of the transmitted data compared to the other methods described herein. This method would need an upgrade of the current 3GPP TS 36.323 specification as a new message for reporting the HFN needs to be defined.

The methods described above could be implemented separately or in combination. In particular, the methods described above which are implemented at the receiving entity could be implemented simultaneously with the methods described above which are implemented at the transmitting entity. However, this may not be necessary, and implementing any one of the methods may be sufficient to improve the alignment in the ciphering parameters between the transmitting entity and the receiving entity.

The method steps of the blocks shown in FIGS. 3, 7 and 9 may be implemented in hardware or in software executed on a processor, e.g. at the UE 106 or at the base stations 104. When the blocks are implemented in software, they may be provided by way of a computer program product embodied on a non-transient computer-readable medium which is configured so as when executed on a processor to perform the function of the blocks as described above.

Some advantages of the methods described herein are that after a handover the SN and HFN are still aligned between the transmitting entity and the receiving entity even when large blocks of PDUs are deleted during the handover. Valid data gets delivered instead of being discarded. The ciphering parameters are still aligned between the sending entity and the receiving entity which allows the receiving entity to receive meaningful data instead of data that gets deciphered wrongly at the receiving entity. This improves the throughput and reliability of the transmission and reception of the data stream. Therefore the user experience is improved.

Furthermore, while this application has been particularly shown and described with reference to embodiments, it will be understood to those skilled in the art that various changes in form and detail may be made without departing from the scope of the application as defined by the appended claims.

The invention claimed is:

1. A method of processing data units at a receiver, the method comprising:
  receiving a plurality of data units, of a data stream, having respective sequence numbers;
  determining, using a reordering window, whether a newly received data unit of the data stream is a new data unit or a repeated data unit at the receiver, wherein the reordering window defines: (i) a first range of sequence numbers relative to the sequence number of a previously received data unit, and (ii) a second range of sequence numbers relative to the sequence number of the previously received data unit, wherein if the sequence number of the newly received data unit falls within the first range then the newly received data unit is determined to be a repeated data unit, and wherein if the sequence number of the newly received data unit falls within the second range then the newly received data unit is determined to be a new data unit;
  processing the newly received data unit at the receiver based on the determination as to whether the newly received data unit is a new data unit or a repeated data unit;
  detecting a handover condition; and
  in response to detecting the handover condition, adjusting the first and second ranges of the reordering window for use during the handover condition.

2. The method of claim 1 wherein the step of adjusting the first and second ranges of the reordering window for use during the handover condition comprises increasing the size of the second range relative to the size of the first range.

3. The method of claim 1 further comprising:
  in response to detecting the handover condition, determining the lowest sequence number of the second range based on a confirmed sequence number which is confirmed by an old cell of the handover and which is assigned to a data unit which will not be transmitted by a new cell of the handover.

4. The method of claim 1 further comprising:
  in response to detecting the handover condition, determining the lowest sequence number of the first range based on the sequence number of the most recently received new data unit of the data stream.

5. The method of claim 1 further comprising:
  in response to detecting the handover condition, determining the lowest sequence number of the first range based on a discard timer used in a transmit queue of a transmitter which transmits the plurality of data units to the receiver.

6. The method of claim 1 wherein said previously received data unit is the most recently received new data unit of the data stream.

7. The method of claim 1 wherein the sequence numbers are incremented for each data unit of the data stream and are repeated after a predetermined maximum number of distinct sequence numbers, whereby a frame number is incremented each time the sequence number repeats.

8. The method of claim 7 wherein the sequence number is represented by 12 bits and the predetermined maximum number is 4096.

9. The method of claim 1 wherein the first and second ranges are contiguous and together span the entire range of sequence numbers assigned to data units of the data stream.

10. The method of claim 1 wherein the step of processing the newly received data unit at the receiver comprises at least one of:
  discarding the newly received data unit;
  storing the newly received data unit;
  forwarding the newly received data unit to higher layers at the receiver; and
  deciphering the newly received data unit using the sequence number of the newly received data unit and a frame number.

11. The method of claim 1 wherein prior to detecting the handover condition the size of the first range is equal to the size of the second range.

12. The method of claim 1 wherein the sequence numbers of the first range are smaller than or equal to the sequence number of the previously received data unit, and wherein the sequence numbers of the second range are larger than the sequence number of the previously received data unit.

13. The method of claim 1 wherein the sequence numbers of a portion of the second range are smaller than the sequence numbers of the first range, and wherein if the newly received data unit has a sequence number which falls within said portion of the second range then a frame number of the newly received data unit is determined to be higher than if the newly received data unit has a sequence number which falls within the first range.

14. A receiver configured to process data, the receiver comprising:
an antenna configured to receive a plurality of data units, of a data stream, having respective sequence numbers; and
a processor configured to:
determine, using a reordering window, whether a newly received data unit of the data stream is a new data unit or a repeated data unit at the receiver, wherein the reordering window defines: (i) a first range of sequence numbers relative to the sequence number of a previously received data unit, and (ii) a second range of sequence numbers relative to the sequence number of the previously received data unit, wherein if the sequence number of the newly received data unit falls within the first range then the newly received data unit is determined to be a repeated data unit, and wherein if the sequence number of the newly received data unit falls within the second range then the newly received data unit is determined to be a new data unit;
process the newly received data unit at the receiver based on the determination as to whether the newly received data unit is a new data unit or a repeated data unit;
detect a handover condition; and
in response to detecting the handover condition, adjust the first and second ranges of the reordering window for use during the handover condition.

15. A non-transient computer readable medium embodied with a computer program product for processing data units at a receiver configured so as when executed on a processor of the receiver to perform a method for processing the data units at the receiver, the method comprising:
receiving a plurality of data units, of a data stream, having respective sequence numbers;
determining, using a reordering window, whether a newly received data unit of the data stream is a new data unit or a repeated data unit at the receiver, wherein the reordering window defines: (i) a first range of sequence numbers relative to the sequence number of a previously received data unit, and (ii) a second range of sequence numbers relative to the sequence number of the previously received data unit, wherein if the sequence number of the newly received data unit falls within the first range then the newly received data unit is determined to be a repeated data unit, and wherein if the sequence number of the newly received data unit falls within the second range then the newly received data unit is determined to be a new data unit;
processing the newly received data unit at the receiver based on the determination as to whether the newly received data unit is a new data unit or a repeated data unit;
detecting a handover condition; and
in response to detecting the handover condition, adjusting the first and second ranges of the reordering window for use during the handover condition.

16. The non-transient computer readable medium of claim 15 wherein the step of adjusting the first and second ranges of the reordering window for use during the handover condition comprises increasing the size of the second range relative to the size of the first range.

17. The non-transient computer readable medium of claim 15 wherein the method further comprises:
in response to detecting the handover condition, determining the lowest sequence number of the second range based on a confirmed sequence number which is confirmed by an old cell of the handover and which is assigned to a data unit which will not be transmitted by a new cell of the handover.

18. The non-transient computer readable medium of claim 15 wherein the method further comprises:
in response to detecting the handover condition, determining the lowest sequence number of the first range based on the sequence number of the most recently received new data unit of the data stream.

19. The non-transient computer readable medium of claim 15 wherein the method further comprises:
in response to detecting the handover condition, determining the lowest sequence number of the first range based on a discard timer used in a transmit queue of a transmitter which transmits the plurality of data units to the receiver.

20. The non-transient computer readable medium of claim 15 wherein the sequence numbers of a portion of the second range are smaller than the sequence numbers of the first range, and wherein if the newly received data unit has a sequence number which falls within said portion of the second range then a frame number of the newly received data unit is determined to be higher than if the newly received data unit has a sequence number which falls within the first range.

* * * * *